US012783620B2

(12) United States Patent
Akutsu et al.

(10) Patent No.: US 12,783,620 B2
(45) Date of Patent: Nov. 3, 2026

(54) AUTHENTICATION CONTROL APPARATUS, AUTHENTICATION SYSTEM, AUTHENTICATION CONTROL METHOD, AND STORAGE MEDIUM

(71) Applicant: NEC Corporation, Tokyo (JP)

(72) Inventors: Tatsuki Akutsu, Tokyo (JP); Akiko Ide, Tokyo (JP)

(73) Assignee: NEC CORPORATION, Tokyo (JP)

( * ) Notice: Subject to any disclaimer, the term of this patent is extended or adjusted under 35 U.S.C. 154(b) by 718 days.

(21) Appl. No.: 17/913,023

(22) PCT Filed: Mar. 30, 2020

(86) PCT No.: PCT/JP2020/014608
§ 371 (c)(1),
(2) Date: Sep. 20, 2022

(87) PCT Pub. No.: WO2021/199176
PCT Pub. Date: Oct. 7, 2021

(65) Prior Publication Data
US 2023/0141541 A1 May 11, 2023

(51) Int. Cl.
*G06F 21/32* (2013.01)
*G06F 3/14* (2006.01)
(Continued)

(52) U.S. Cl.
CPC ................ *G06F 21/32* (2013.01); *G06F 3/14* (2013.01); *G06T 7/90* (2017.01); *G06V 40/172* (2022.01);
(Continued)

(58) Field of Classification Search
CPC ... G06F 21/32; G06F 3/14; G06T 7/90; G06T 2207/10024; G06T 2207/30201; G06C 9/37; G06V 40/172
(Continued)

(56) References Cited

U.S. PATENT DOCUMENTS

2010/0245042 A1* 9/2010 Tsubaki .................. G06F 21/32
340/5.82
2016/0006797 A1 1/2016 Aoki et al.
(Continued)

FOREIGN PATENT DOCUMENTS

JP 2006-293913 A 10/2006
JP 2019-200669 A 11/2019
(Continued)

OTHER PUBLICATIONS

International Search Report for PCT Application No. PCT/JP2020/014608, mailed on Aug. 4, 2020.

*Primary Examiner* — Gabriel I Garcia
(74) *Attorney, Agent, or Firm* — Sughrue Mion, PLLC

(57) ABSTRACT

An authentication control apparatus according to the present disclosure includes: image acquisition means for acquiring an image including a person to be authenticated captured by a camera that photographs the person to be authenticated; authentication control means for causing an authentication apparatus that executes face authentication to execute face authentication of the person to be authenticated included in the image acquired by the image acquisition means; and display control means for causing, when the face authentication has been successfully performed, a display apparatus to display privacy protection information on the person to be authenticated whose face has been successfully authenticated for the purpose of enabling the person to be authenticated whose face has been successfully authenticated to visually recognize that the face authentication has been successful.

16 Claims, 12 Drawing Sheets

(51) Int. Cl.
*G06T 7/90* (2017.01)
*G06V 40/16* (2022.01)
*G07C 9/37* (2020.01)

(52) U.S. Cl.
CPC ...... *G07C 9/37* (2020.01); *G06T 2207/10024* (2013.01); *G06T 2207/30201* (2013.01)

(58) Field of Classification Search
USPC .......................................................... 382/118
See application file for complete search history.

(56) References Cited

U.S. PATENT DOCUMENTS

| | | | | |
|---|---|---|---|---|
| 2019/0091583 | A1* | 3/2019 | Oyama | G07F 17/323 |
| 2020/0226966 | A1* | 7/2020 | Shin | G09G 3/2003 |
| 2021/0397685 | A1* | 12/2021 | Takenouchi | G06F 21/32 |

FOREIGN PATENT DOCUMENTS

| | | | | |
|---|---|---|---|---|
| JP | 2020-038545 | A | 3/2020 | |
| WO | WO-2012086657 | A1 * | 6/2012 | G06F 21/32 |
| WO | 2014/128836 | A1 | 8/2014 | |

* cited by examiner

AUTHENTICATION CONTROL APPARATUS, AUTHENTICATION SYSTEM, AUTHENTICATION CONTROL METHOD, AND STORAGE MEDIUM

This application is a National Stage Entry of PCT/JP2020/014608 filed on Mar. 30, 2020, the contents of all of which are incorporated herein by reference, in their entirety.

TECHNICAL FIELD

The present disclosure relates to an authentication control apparatus, an authentication system, an authentication control method, and a storage medium.

BACKGROUND ART

For example, Patent Literature 1 discloses a system in which face authentication is executed based on an image obtained by capturing, by a camera, a target person to be recognized whose presence in front of the camera has been detected, and when the face authentication has been successfully performed, personal information (name and the like) of the person to be authenticated is displayed.

CITATION LIST

Patent Literature

[Patent Literature 1] Japanese Unexamined Patent Application Publication No. 2006-293913

SUMMARY OF INVENTION

Technical Problem

However, there is a problem in the system disclosed in Patent Literature 1 that, when a third party is present near the target person to be recognized, it is impossible for the target person to be recognized to know that his/her face has been successfully authenticated without his/her personal information being known to the third party.

In view of the aforementioned problem, an object of the present disclosure is to provide an authentication control apparatus, an authentication system, an authentication control method, and a storage medium capable of enabling, when a third party is present near a target person to be recognized, the target person to be recognized to know that his/her face has been successfully authenticated without his/her personal information being known to the above third party.

Solution to Problem

An authentication control apparatus according to a first aspect of the present disclosure includes: image acquisition means for acquiring an image including a person to be authenticated captured by a camera that photographs the person to be authenticated; authentication control means for causing an authentication apparatus that executes face authentication to execute face authentication of the person to be authenticated included in the image acquired by the image acquisition means; and display control means for causing, when the face authentication has been successfully performed, a display apparatus to display privacy protection information of the person to be authenticated whose face has been successfully authenticated for the purpose of letting the person to be authenticated whose face has been successfully authenticated visually recognize that the face authentication has been successful.

An authentication system according to a second aspect of the present disclosure includes: a camera that photographs a person to be authenticated; a display apparatus; image acquisition means for acquiring an image that includes a person to be authenticated who has been captured by the camera; authentication control means for causing an authentication apparatus that executes face authentication to execute face authentication of the person to be authenticated included in the image acquired by the image acquisition means; and display control means for causing, when the face authentication has been successfully performed, the display apparatus to display privacy protection information of the person to be authenticated whose face has been successfully authenticated for the purpose of letting the person to be authenticated whose face has been successfully authenticated visually recognize that the face authentication has been successful.

An authentication control method according to a third aspect of the present disclosure includes: an image acquisition step of acquiring an image including a person to be authenticated captured by a camera that photographs the person to be authenticated; an authentication control step of causing an authentication apparatus that executes face authentication to execute face authentication of the person to be authenticated included in the image acquired in the image acquisition step; and a display control step of causing, when the face authentication has been successfully performed, a display apparatus to display privacy protection information of the person to be authenticated whose face has been successfully authenticated for the purpose of letting the person to be authenticated whose face has been successfully authenticated visually recognize that the face authentication has been successful.

A storage medium according to a fourth aspect of the present disclosure is a computer readable storage medium storing a program for causing an electronic device including at least one processor to execute: an image acquisition step of acquiring an image including a person to be authenticated captured by a camera that photographs the person to be authenticated; an authentication control step of causing an authentication apparatus that executes face authentication to execute face authentication of the person to be authenticated included in the image acquired in the image acquisition step; and a display control step of causing, when the face authentication has been successfully performed, a display apparatus to display privacy protection information of the person to be authenticated whose face has been successfully authenticated for the purpose of letting the person to be authenticated whose face has been successfully authenticated visually recognize that the face authentication has been successful.

Advantageous Effects of Invention

According to the present invention, it is possible to provide an authentication control apparatus, an authentication system, an authentication control method, and a storage medium capable of enabling, when a third party is present near a target person to be recognized, the target person to be recognized to know that his/her face has been successfully authenticated without his/her personal information being known to the above third party.

EXAMPLE EMBODIMENT

First Example Embodiment

Figure 1:
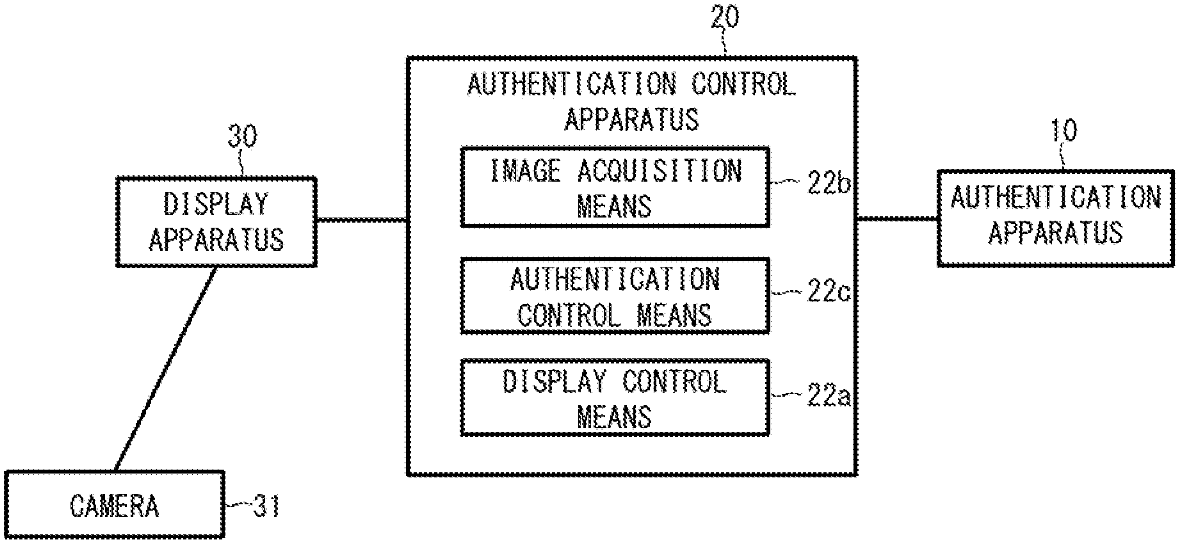
FIG. 1 is a schematic configuration diagram of an authentication control apparatus 20.

Referring first to FIG. 1, a configuration example of an authentication control apparatus 20 that forms an authentication system according to a first example embodiment will be described.

FIG. 1 is a schematic configuration diagram of the authentication control apparatus 20.

As shown in FIG. 1, the authentication control apparatus 20 includes: image acquisition means 22*b* for acquiring an image including a person to be authenticated photographed by a camera 31 that photographs the person to be authenticated; authentication control means 22*c* for causing an authentication apparatus 10 that executes face authentication to execute face authentication of the person to be authenticated included in the image acquired by the image acquisition means 22*b*; and display control means 22*a* for causing, when the face authentication has been successfully performed, the display apparatus 30 to display privacy protection information on the person to be authenticated whose face has been successfully authenticated for the purpose of enabling the person to be authenticated whose face has been successfully authenticated to visually recognize that the face authentication has been successful.

Next, one example of operations of the authentication control apparatus 20 having the aforementioned configuration will be described.

Figure 2:
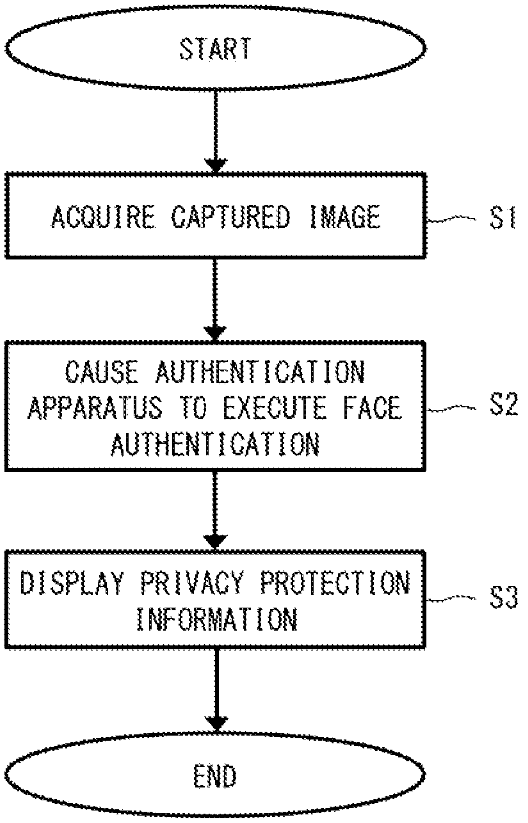
FIG. 2 is a flowchart showing one example of an operation of the authentication control apparatus 20.

FIG. 2 is a flowchart showing one example of an operation of the authentication control apparatus 20.

First, the image acquisition means 22*b* acquires a captured image including the person to be authenticated photographed by the camera 31 that photographs the person to be authenticated (Step S1). Next, the authentication control means 22*c* causes the authentication apparatus 10 that executes face authentication to execute the face authentication of the person to be authenticated included in the captured image acquired in Step S1 (Step SS2). Next, when the face authentication has been successfully performed, the display control means 22*a* causes the display apparatus 30 to display privacy protection information on the person to be authenticated whose face has been successfully authenticated for the purpose of enabling the person to be authenticated whose face has been successfully authenticated to visually recognize that the face authentication has been successful (Step S3).

As described above, according to the first example embodiment, the privacy protection information on the person to be authenticated whose face has been successfully authenticated is displayed, whereby, even in a case in which a third party is present near the target person to be recognized, it is possible for the target person to be recognized to know that his/her face has been successfully authenticated without his/her personal information being known to the above third party.

Second Example Embodiment

Hereinafter, an authentication system 1 will be described in detail as a second example embodiment of the present invention. An image acquisition unit is used as the image acquisition means 22*b*. This will be referred also to as an image acquisition unit 22*b*. Further, an authentication control unit is used as the authentication control means 22*c*. This will be referred also to as an authentication control unit 22*c*. Further, a display control unit is used as the display control means 22*a*. This will be referred also to as a display control unit 22*a*. Further, a display terminal is used as the display apparatus 30. This will be referred also to as a display terminal 30.

Figure 3:
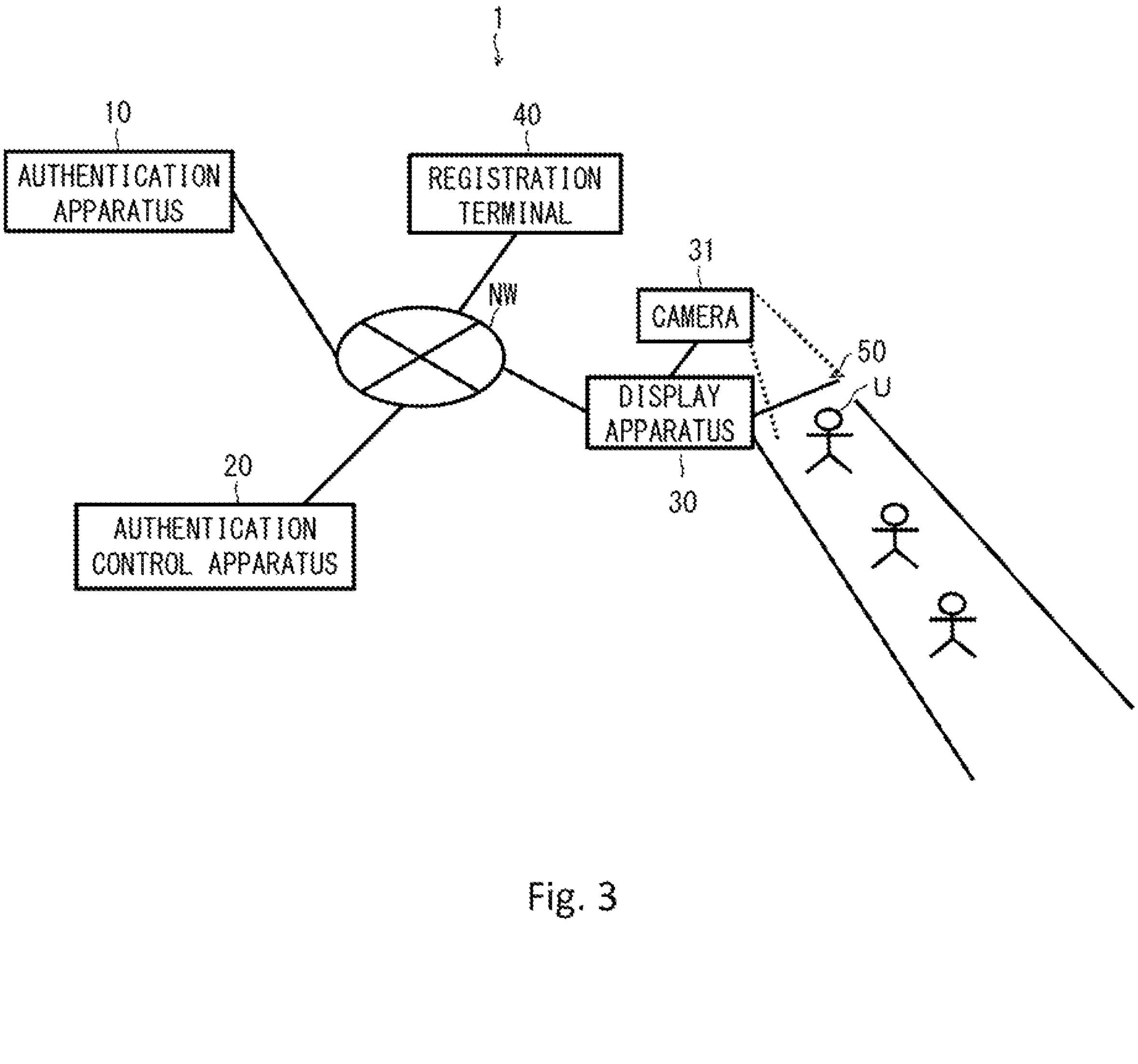
FIG. 3 is a block diagram showing a configuration of an authentication system 1 according to a second example embodiment.

FIG. 3 is a block diagram showing a configuration of the authentication system 1 according to the second example embodiment.

The authentication system 1 includes an authentication apparatus 10, an authentication control apparatus 20, a display terminal 30, a registration terminal 40, and a security gate 50 capable of communicating with one another via a network NW (e.g., the Internet).

First, a configuration example of the authentication apparatus 10 will be described.

Figure 4:
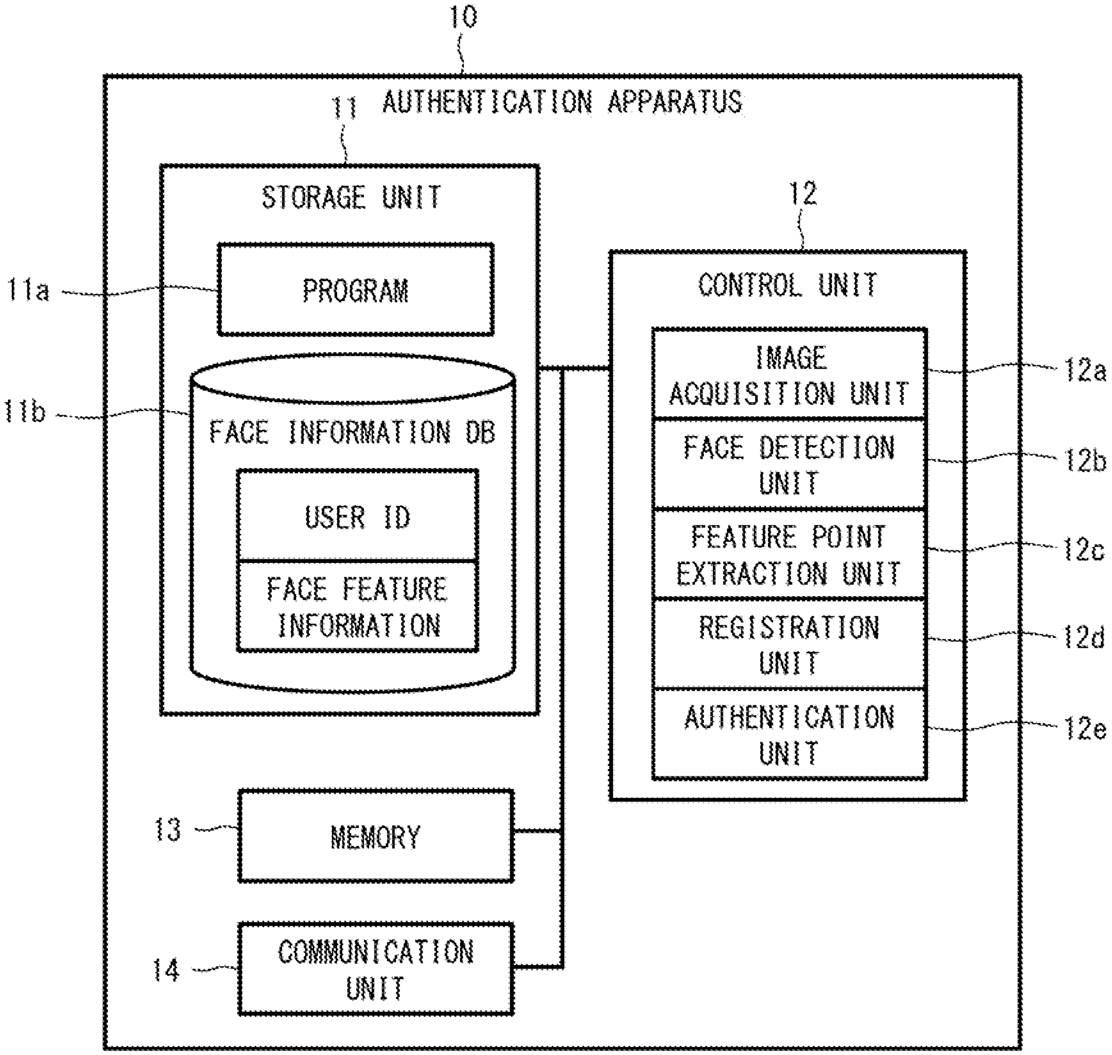
FIG. 4 is a schematic configuration diagram of an authentication apparatus 10.

FIG. 4 is a schematic configuration diagram of the authentication apparatus 10.

As shown in FIG. 4, the authentication apparatus 10 includes a storage unit 11, a control unit 12, a memory 13, and a communication unit 14.

The storage unit 11 is, for example, a non-volatile storage unit such as a hard disk device or a ROM. The storage unit 11 stores a program 11*a* and a face information DB 11*b*.

The program 11*a* is a program executed by the control unit 12 (a processor). User ID(s) and face feature information on the user (target person to be recognized) are stored (registered) in the face information DB 11*b* in such a way that the user ID(s) and the face feature information are associated with each other. Further, the authentication apparatus 10 compares, in accordance with a face authentication request externally received (received from, for example, the authentication control apparatus 20), the face image or face feature information included in the request, with face feature information of each target person to be recognized, and sends the result of the comparison back to the request source.

The control unit 12 includes a processor, although it is not shown. The processor is, for example, a Central Processing Unit (CPU). The processor may be one or more than one. The processor executes the program 11*a* loaded from the storage unit 11 into the memory 13 (e.g., RAM), thereby functioning as an image acquisition unit 12*a*, a face detection unit 12*b*, a feature point extraction unit 12*c*, a registration unit 12*d*, or an authentication unit 12*e*. Some or all of them may be implemented by hardware.

The image acquisition unit 12*a* acquires an image including the face of the person to be authenticated. The image acquisition unit 12*a* acquires, for example, the image received by the communication unit 14. The image received by the communication unit 14 includes an image for registration or an image for authentication (comparison) transmitted from the authentication control apparatus 20.

The face detection unit 12*b* detects a face region from the image acquired by the image acquisition unit 12*a* and outputs the detected face region to the feature point extraction unit 12*c*.

The feature point extraction unit 12*c* extracts feature points (e.g., feature points of the face such as eyes, nose, or corners of the mouth) from the face region detected by the face detection unit 12*b*.

When the image acquired by the image acquisition unit 12*a* is an image for registration, the feature point extraction unit 12*c* outputs the face feature information to the registration unit 12*d*. The face feature information here is a set of feature points that have been extracted. On the other hand, when the image acquired by the image acquisition unit 12*a* is an image for authentication, the feature point extraction unit 12*c* outputs the face feature information to the authentication unit 12*e*.

The registration unit 12*d* newly issues a user ID when the face feature information is registered therein. The registration unit 12*d* registers the issued user ID in association with the face feature information extracted from the image for registration in the face information DB 11*b*.

The authentication unit 12*e* compares the face feature information extracted from the face region detected from the image for authentication with the face feature information in the face information DB 11*b*. The authentication unit 12*e* sends information regarding whether face feature information items match each other back to the authentication control apparatus 20. The information indicating whether or not the face feature information items match each other corresponds to information indicating whether or not authentication has been successful.

The communication unit 14 is a communication apparatus that communicates with the authentication control apparatus 20 via the network NW.

Next, one example of an operation of the authentication apparatus 10 (face information registration processing) will be described.

Figure 5:
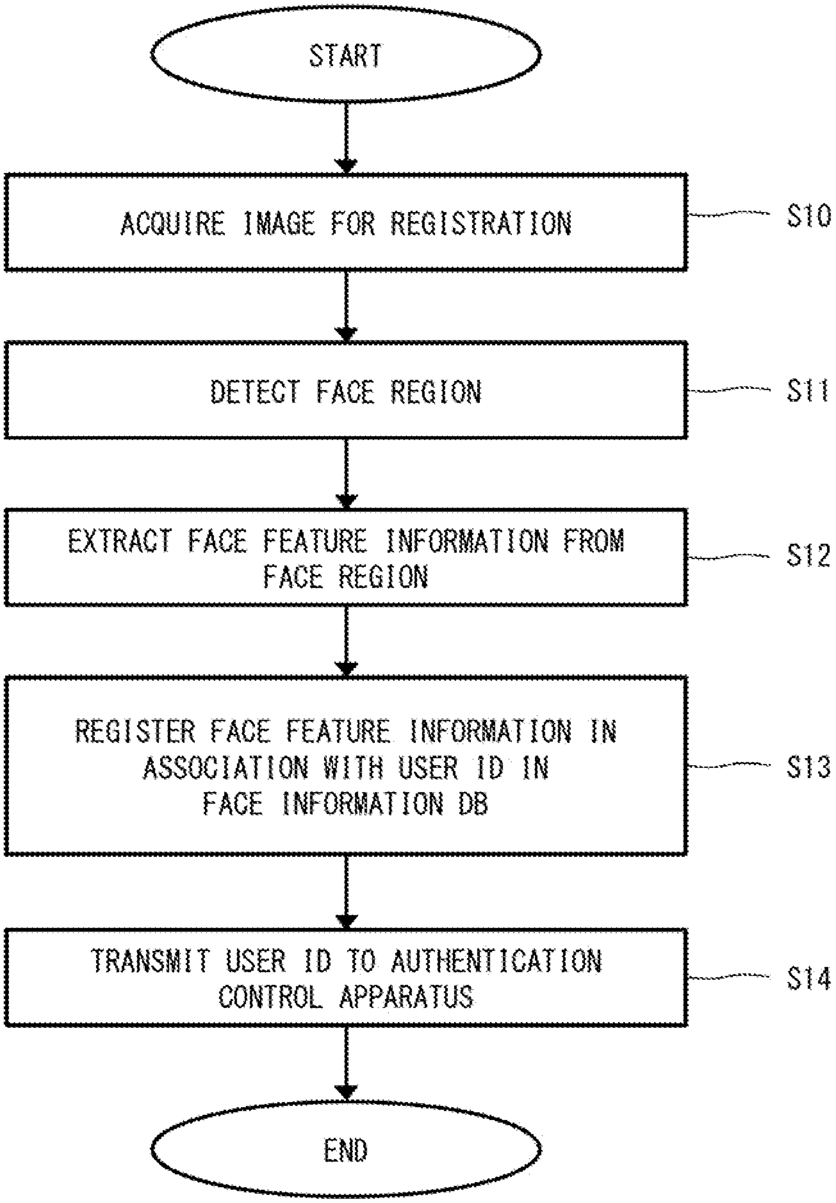
FIG. 5 is a flowchart showing one example of an operation of the authentication apparatus 10 (face information registration processing)

FIG. 5 is a flowchart showing one example of an operation of the authentication apparatus 10 (face information registration processing).

First, the authentication apparatus 10 (the image acquisition unit 12*a*) acquires an image (image for registration) including the face of the person to be authenticated included in a face information registration request (Step S10). For example, the authentication apparatus 10 (the communication unit 14) receives the face information registration request from the authentication control apparatus 20 via the network NW.

Next, the authentication apparatus 10 (the face detection unit 12*b*) detects the face region from the image for registration acquired in Step S10 (Step S11). Next, the authentication apparatus 10 (the feature point extraction unit 12*c*) extracts the feature points of the face from the face region detected in Step S11 (Step S12) and outputs the face feature information to the registration unit 12*d*. Lastly, the authentication apparatus 10 (the registration unit 12*d*) issues a user ID and registers the user ID in association with the face feature information in the face information DB 11*b* (Step S13). Note that the authentication apparatus 10 may receive the face feature information from the authentication control apparatus 20 and register the received face feature information in association with the user ID in the face information DB 11*b*. Next, the authentication apparatus 10 (the communication unit 14) transmits the result of the registration (the user ID issued in Step S13) to the authentication control apparatus 20 that has transmitted the face information registration request.

Next, one example of an operation of the authentication apparatus 10 (face authentication processing) will be described.

Figure 6:
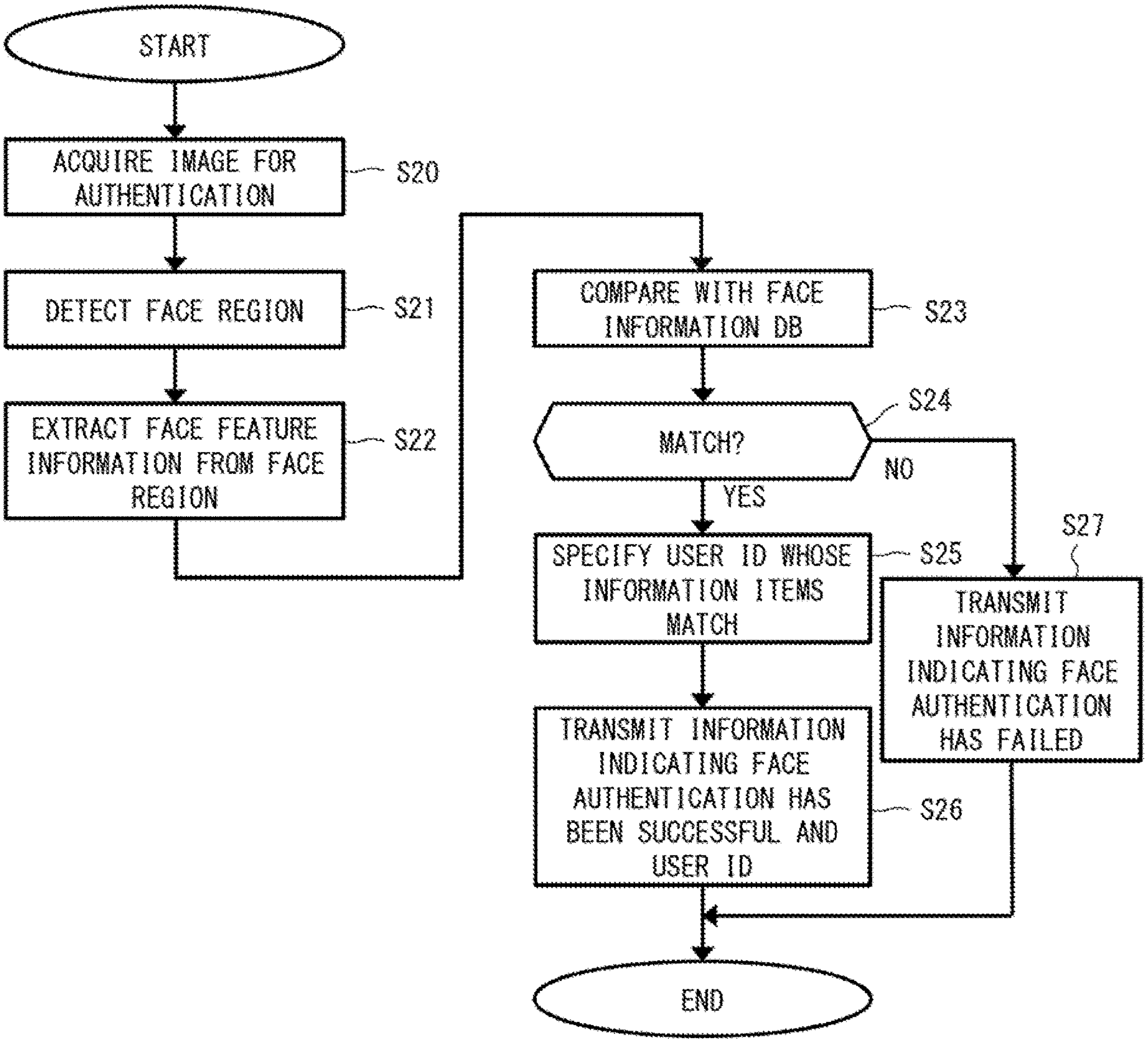
FIG. 6 is a flowchart showing one example of an operation of the authentication apparatus 10 (face authentication processing)

FIG. 6 is a flowchart showing one example of an operation of the authentication apparatus 10 (face authentication processing).

First, the authentication apparatus 10 (the image acquisition unit 12*a*) acquires an image (image for authentication) including the face of the person to be authenticated included in the face authentication request (Step S20). For example, the authentication apparatus 10 (the communication unit 14) receives the face authentication request from the authentication control apparatus 20 via the network NW. Next, the authentication apparatus 10 (the face detection unit 12*b*) detects the face region from the image for authentication acquired in Step S20 (Step S21). Next, the feature point extraction unit 12*c* extracts feature points of the face from the face region detected in Step S21 (Step S22). Alternatively, the authentication apparatus 10 may receive the face feature information from the authentication control apparatus 20. Next, the authentication apparatus 10 (the authentication unit 12*e*) compares the acquired face feature information with the face information DB 11*b* (Step S23). When the face feature information items match each other (Step S24: Yes), the authentication unit 12*e* specifies the user ID of the user whose face feature information items has matched each other (Step S25), and sends information indicating that the face authentication has been successful and the specified user ID back to the authentication control apparatus 20 (Step S26). When there are no face feature information items that match each other (Step S24: No), the authentication unit 12*e* sends information indicating that the face authentication has failed back to the authentication control apparatus 20 (Step S27).

Next, a configuration example of the authentication control apparatus 20 will be described.

Figure 7:
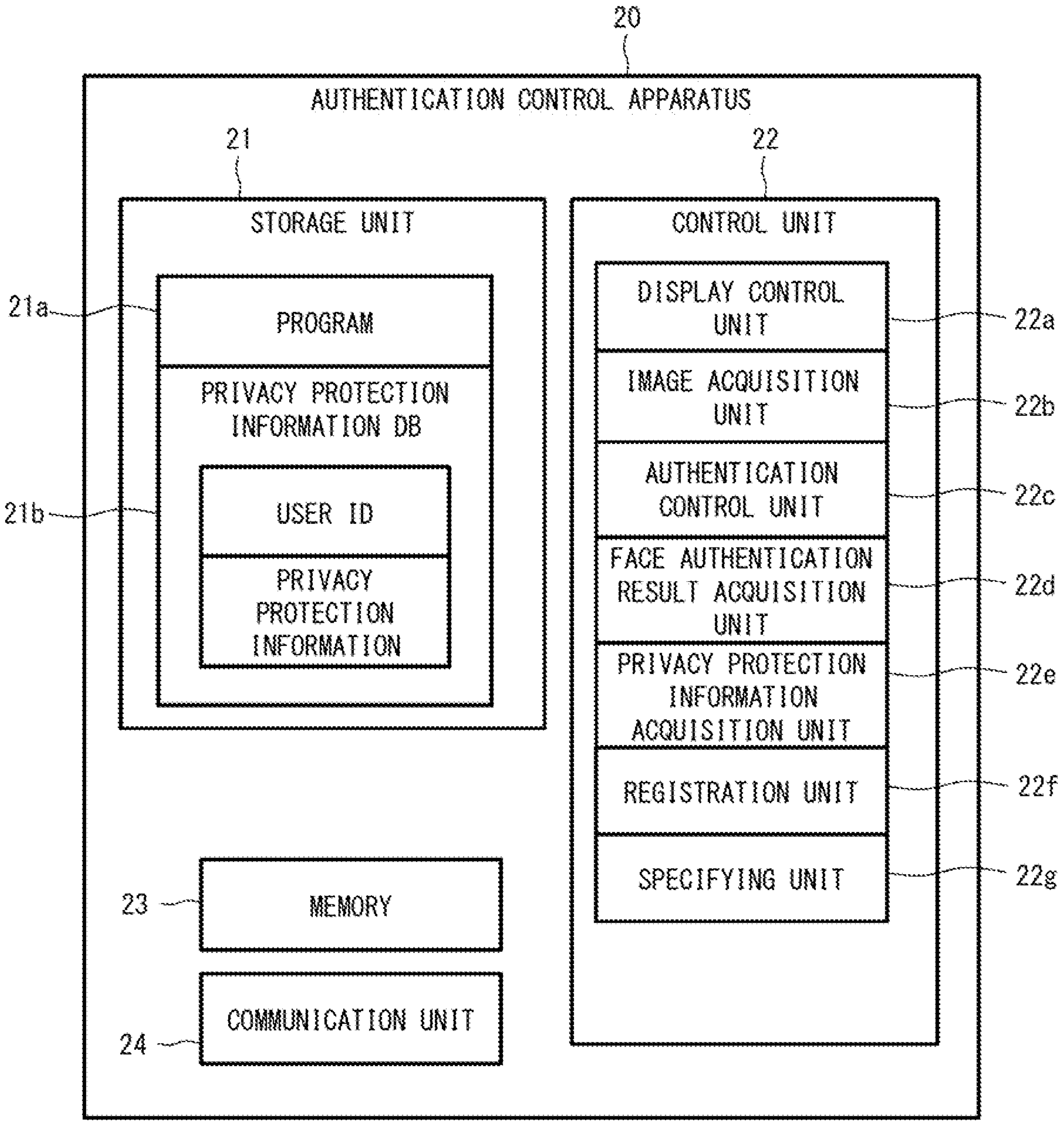
FIG. 7 is a schematic configuration diagram of an authentication control apparatus 20.

FIG. 7 is a schematic configuration diagram of the authentication control apparatus 20.

The authentication control apparatus 20, which is an information processing apparatus that performs authentication control processing, is, for example, a server apparatus implemented by a computer.

As shown in FIG. 7, the authentication control apparatus 20 includes a storage unit 21, a control unit 22, a memory 23, and a communication unit 24.

The storage unit 21 is a non-volatile storage unit such as a hard disk device or a ROM. The storage unit 21 stores a program 21*a* and a privacy protection information DB 21*b*.

Figure 10:
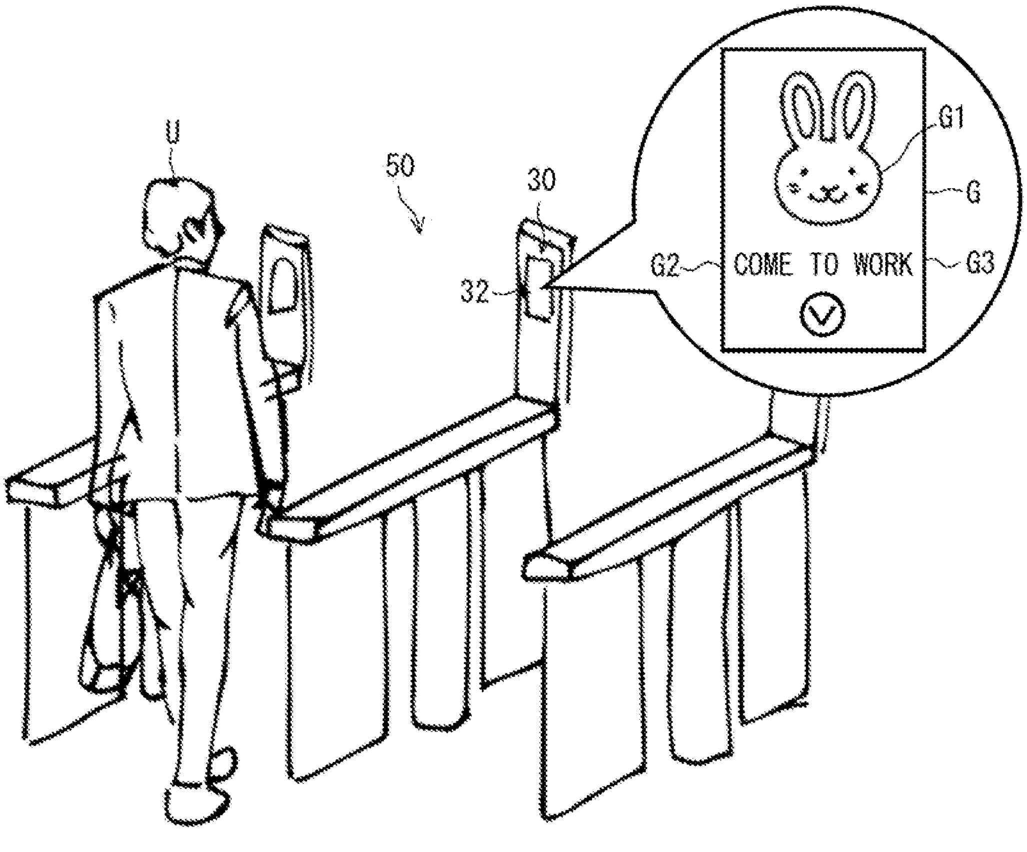
FIG. 10 is an external view of a display terminal 30.

The program 21*a* is a program executed by the control unit 22 (processor). The privacy protection information DB 21*b* stores (registers) the user ID(s) and privacy protection information of this user (target person to be recognized) in association with each other. The privacy protection information is information notifying the person to be authenticated whose face has been successfully authenticated that his/her face has been successfully authenticated, the information not including his/her personal information (e.g., the name of the person to be authenticated, the name of the company for which he/she works). The privacy protection information includes information registered by the person to be authenticated (user) in order to notify that his/her face has been successfully authenticated. The privacy protection information is, for example, an image such as an avatar image. The avatar image is specified, for example, (or selected) by the person to be authenticated in the registration terminal 40. The avatar image is an image including a character, which is an alter ego of the person to be authenticated. The character shown by a symbol G1 in FIG. 10 is one example of the avatar image. The character may be any one. For example, the character may be a living creature (e.g., a person, an animal, or a plant) or may be an inanimate object (e.g., a building or a landscape). The living creature or the inanimate object may or may not actually exist. Further, the character may or may not be anthropomorphized. Further, the character may be expressed in two dimensions or in three dimensions. Further, the character may be a video image or may be a still image. Further, the privacy protection information may be "information associated in advance with the person to be authenticated", "information defined for each person to be authenticated", or "information specific to the person to be authenticated".

The control unit 22 includes a processor, although it is not shown in the drawings. The processor is, for example, a Central Processing Unit (CPU). The processor may be one or more than one. The processor executes the program 21*a* loaded into the memory 23 (e.g., RAM) from the storage unit 21, thereby functioning as a display control unit 22*a*, an image acquisition unit 22*b*, an authentication control unit 22*c*, a face authentication result acquisition unit 22*d*, a privacy protection information acquisition unit 22*e*, a registration unit 22*f*, or a specifying unit 22*g*. Some or all of them may be implemented by hardware.

When, for example, the face authentication has been successfully performed, the display control unit 22*a* causes the display terminal 30 to display the privacy protection information on the person to be authenticated whose face has been successfully authenticated (i.e., privacy protection information specified by the specifying unit 22*g* that will be described later) for the purpose of enabling the person to be authenticated whose face has been successfully authenticated to visually recognize that the face authentication has been successful. Specifically, the display control unit 22*a* transmits a privacy protection information display instruction for displaying the privacy protection information on the person to be authenticated whose face has been successfully authenticated to the display terminal 30 via the communication unit 24.

The image acquisition unit 22*b* acquires an image including the person to be authenticated who is in front of the security gate 50, the image being captured by the camera 31 (hereinafter this will be referred also to as a captured image). Specifically, the communication unit 24 receives the captured image transmitted from the display terminal 30 and the image acquisition unit 22*b* acquires the captured image received by the communication unit 24.

The authentication control unit 22*c* causes the authentication apparatus 10 that executes the face authentication to execute the face authentication of the person to be authenticated included in the captured image acquired by the image acquisition unit 22*b*. Specifically, the authentication control unit 22*c* transmits the captured image acquired by the image acquisition unit 22*b* to the authentication apparatus 10 via the communication unit 24. In place of the captured image, the face region detected from the captured image (or feature points extracted from the face region) may be transmitted to the authentication apparatus 10.

The face authentication result acquisition unit 22*d* acquires the result of the face authentication executed by the authentication apparatus 10. Specifically, the communication unit 24 receives the result of the face authentication transmitted from the authentication apparatus 10 and the face authentication result acquisition unit 22*d* acquires the result of the face authentication that the communication unit 24 has received.

The privacy protection information acquisition unit 22*e* acquires the privacy protection information. Specifically, the communication unit 24 in receives the privacy protection information to be registered transmitted from the registration terminal 40 and the privacy protection information acquisition unit 22*e* acquires the privacy protection information to be registered that has been received by this communication unit 24.

The registration unit 22*f* registers the user ID of the user (person to be authenticated) registered in the authentication apparatus 10 in association with the privacy protection information acquired by the privacy protection information acquisition unit 22*e* in the privacy protection information DB 21*b*.

The specifying unit 22*g* specifies the privacy protection information associated with the person to be authenticated (user ID) whose face has been successfully authenticated in the storage unit 21 (the privacy protection information DB 21*b*).

Next, one example of an operation of the authentication control apparatus 20 (privacy protection information registration processing) will be described.

Figure 8:
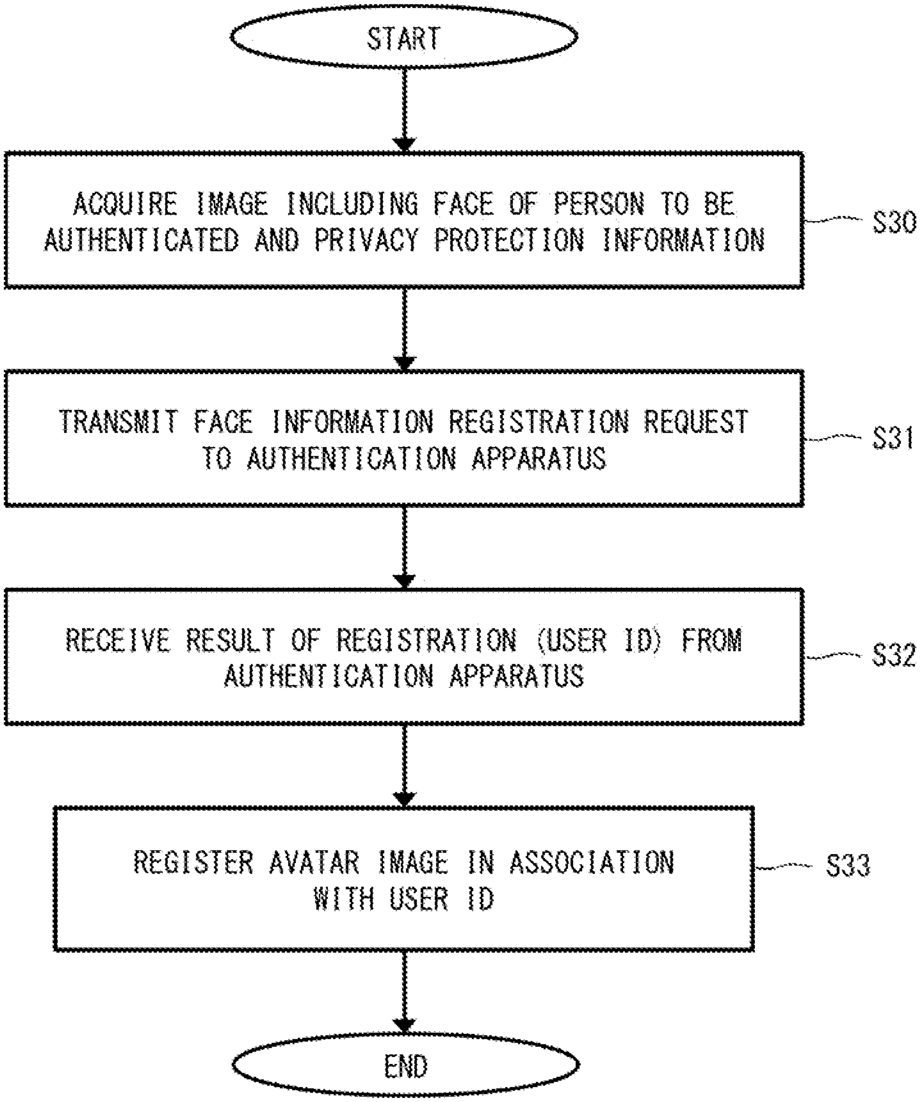
FIG. 8 is a flowchart showing one example of an operation of the authentication control apparatus 20 (privacy protection information registration processing)

FIG. 8 is a flowchart showing one example of an operation of the authentication control apparatus 20 (privacy protection information registration processing).

First, the authentication control apparatus 20 (the privacy protection information acquisition unit 22*e*) acquires an image (image for registration) including the face of the person to be authenticated (privacy protection information registration request person) and the privacy protection information (Step S30). For example, the communication unit 24 receives the privacy protection information registration request transmitted from the registration terminal 40 and the face authentication result acquisition unit 22*d* acquires the privacy protection information registration request that has been received by the communication unit 24. This privacy protection information registration request includes an image including the face of the person to be authenticated (image for registration) and the privacy protection information to be registered. This privacy protection information to be registered is, for example, the one that has been specified (or selected) by the person to be authenticated in the registration terminal 40.

Next, the authentication control apparatus 20 (the communication unit 24) transmits a face information registration request to the authentication apparatus 10 (Step S31). This face information registration request includes an image (image for registration) including the face of the person to be authenticated (the privacy protection information registration request person) acquired in Step S30. Next, the authentication control apparatus 20 (the communication unit 24) receives the result of the registration (user ID) transmitted from the authentication apparatus 10 (Step S32).

Next, the authentication control apparatus 20 (the registration unit 22*f*) registers the privacy protection information acquired in Step S30 in association with the user ID received in Step S32 in the storage unit 21 (the privacy protection information DB 21*b*) (Step S33).

Next, one example of an operation of the authentication control apparatus 20 (privacy protection information specifying processing) will be described.

Figure 9:
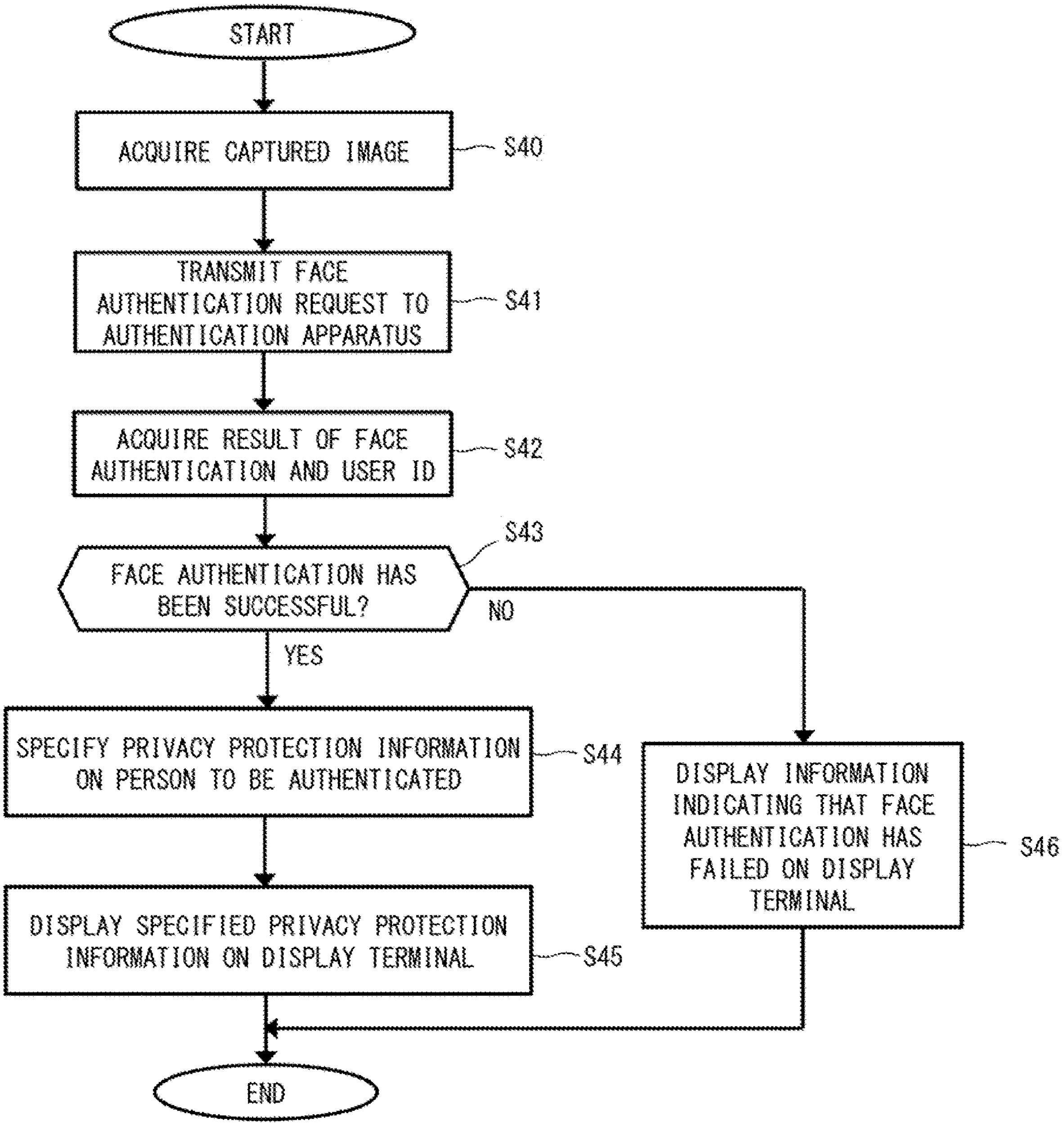
FIG. 9 is a flowchart showing one example of an operation of the authentication control apparatus 20 (privacy protection information specifying processing)

FIG. 9 is a flowchart showing one example of an operation of the authentication control apparatus 20 (privacy protection information specifying processing).

First, the authentication control apparatus 20 (the image acquisition unit 22*b*) acquires a captured image including the person to be authenticated who has been captured by the camera 31 and is in front of the security gate 50 (Step S40). For example, the communication unit 24 receives the captured image transmitted from the display terminal 30 and the image acquisition unit 22*b* acquires the captured image received by the communication unit 24. Next, the authentication control apparatus 20 (the communication unit 24) transmits a face authentication request for requesting face authentication of the person to be authenticated included in the captured image acquired in Step S40 to the authentication apparatus 10 via the communication unit 24 (Step S41). This face authentication request includes the captured image (image for authentication) acquired in Step S40.

Next, the authentication control apparatus 20 (the communication unit 24) receives the result of the face authentication and the user ID transmitted from the authentication apparatus 10 and the face authentication result acquisition unit 22*d* acquires the result of the face authentication and the user ID that the communication unit 24 has received (Step S42).

When the face authentication has been successfully performed (Step S43: YES), that is, when the result of the face authentication acquired in Step S42 indicates that authentication has been successfully performed, the authentication control apparatus 20 (specifying unit 22*g*) specifies the privacy protection information on the person to be authenticated whose face has been successfully authenticated, i.e., the privacy protection information associated with the user ID acquired in Step S42 in the storage unit 21 (the privacy protection information DB 21*b*) (Step S44).

Next, the authentication control apparatus 20 (the display control unit 22*a*) causes the display terminal 30 to display the privacy protection information specified in Step S44 for the purpose of enabling the person to be authenticated whose face has been successfully authenticated to visually recognize that the face authentication has been successful. Specifically, the display control unit 22*a* transmits a privacy protection information display instruction for causing the privacy protection information specified in Step S44 to be displayed to the display terminal 30 via the communication unit 24. This privacy protection information display instruction includes the privacy protection information specified in Step S44.

On the other hand, when the face authentication has failed (Step S43: NO), that is, when the result of the face authentication acquired in Step S42 indicates that the authentication has failed, the authentication control apparatus 20 (the communication unit 24) causes the display terminal 30 to display that the face authentication of the person to be authenticated has failed so that this person to be authenticated can visually recognize that the face authentication has been failed (Step S46). Specifically, the display control unit 22*a* transmits a display instruction for causing the display terminal 30 to display the information indicating that the face authentication has failed to the display terminal 30 via the communication unit 24.

Next, a configuration example of the display terminal 30 will be described.

Figure 11:
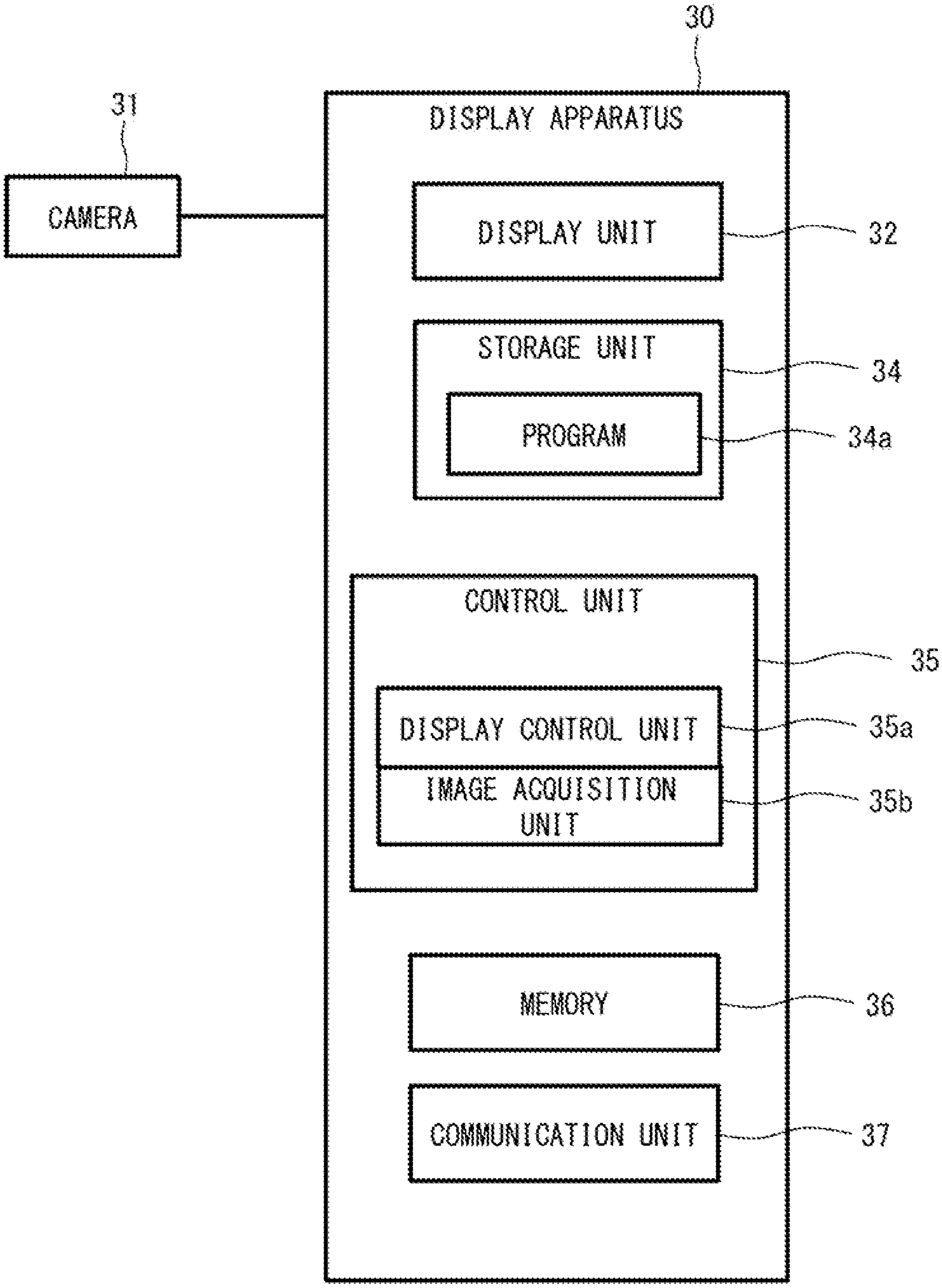
FIG. 11 is a schematic configuration diagram of the display terminal 30.

FIG. 10 shows an external view of the display terminal 30 and FIG. 11 is a schematic configuration diagram.

As shown in FIGS. 10 and 11, the display terminal 30 is an information processing apparatus including a camera 31, a display unit 32, a storage unit 34, a control unit 35, a memory 36, and a communication unit 37. The display terminal 30 is provided, as shown in, for example, FIGS. 3 and 10, in a security gate 50 (or near the security gate 50) installed at the entrance of a building or the entrance of a floor inside the building. Further, as shown in FIG. 3, the camera 31 is provided, for example, near the security gate 50. The authentication apparatus 10 and the authentication control apparatus 20 are installed in a remote place from the security gate 50.

The camera 31 captures an image including the person to be authenticated who is in front of the security gate 50. As shown in FIG. 1, the camera 31 captures, for example, a person to be authenticated U who is walking toward the security gate 50 through which this person is going to pass. Alternatively, the camera 31 may photograph the person to be authenticated U who has stopped in front of the security gate 50 through which the person is going to pass, as shown in FIG. 10. The camera 31 is provided in, for example, the security gate 50 (or near the security gate 50) so that it can photograph the face of the person to be authenticated U, that is, the face of the person to be authenticated U who is facing toward the traveling direction from the front or from substantially the front (so that it can photograph the face of the person to be authenticated U at an angle suitable for face authentication).

The display unit 32 is, for example, a display such as a liquid crystal display. For example, a screen G including privacy protection information G1 (hereinafter this will be referred also to as an avatar image G1) is displayed on the display surface of the display unit 32 (see FIG. 10). The display unit 32 (display surface) is one example of the display area where the privacy protection information according to the present invention is displayed. This screen G includes, besides the privacy protection information G1, time information G2 indicating the time at which the user passes through the security gate 50, and purpose information G3 indicating the purpose (e.g., come to work or leave office after working) for passing through the security gate 50. As shown in FIG. 10, the display unit 32 is provided in the security gate 50 (or near the security gate 50) in such a way that the person to be authenticated U is able to visually recognize the screen G including his/her privacy protection information G1.

The storage unit 34 is a non-volatile storage unit such as a hard disk device or a ROM. The storage unit 34 stores a program 34*a*.

The program 34*a* is a program executed by a control unit 35 (a processor).

The control unit 35 includes a processor that is not shown. The processor is, for example, a Central Processing Unit (CPU). The processor may be one or more than one. The processor executes the program 34*a* loaded into the memory 36 (e.g., RAM) from the storage unit 34, thereby functioning as a display control unit 35*a* or an image acquisition unit 35*b*. Some or all of them may be implemented by hardware.

When, for example, the communication unit 37 has received the privacy protection information display instruction for displaying the privacy protection information transmitted from the authentication control apparatus 20, the display control unit 35*a* displays the screen G (see FIG. 10)

including the privacy protection information on the display surface of the display unit 32. The screen G including the privacy protection information may be displayed in advance based on the information stored in the storage unit 34 of the display terminal 30 or may be displayed based on the information received from the authentication control apparatus 20 along with the privacy protection information display instruction. The image acquisition unit 35*b* acquires, from the camera 31, the captured image including the person to be authenticated who is in front of the security gate 50 and has been captured by the camera 31.

The communication unit 37 is a communication apparatus that communicates with the authentication control apparatus 20 via the network NW.

Next, one example of an operation of the authentication system 1 having the aforementioned configuration will be described.

Figure 12:
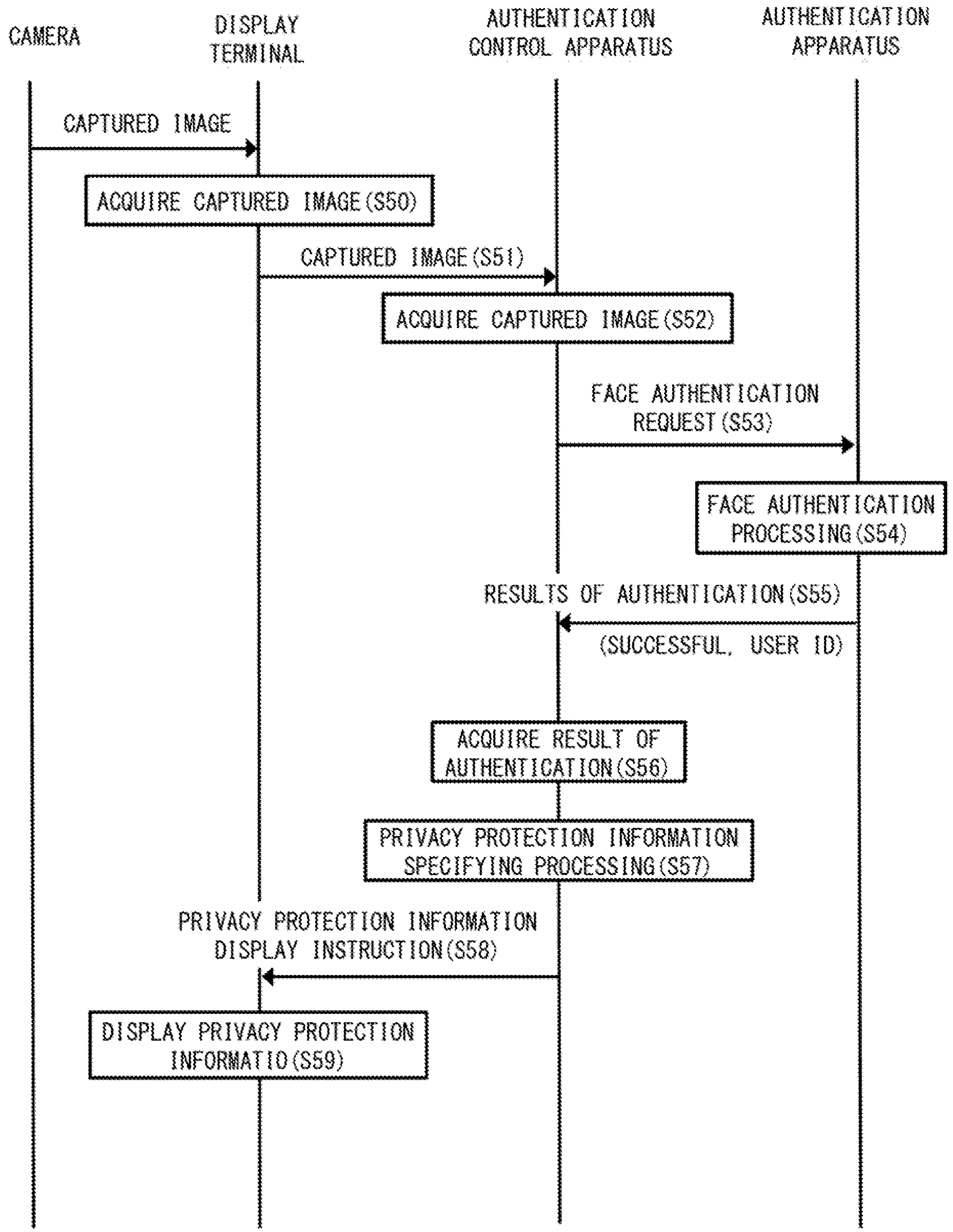
FIG. 12 is a sequence diagram of an authentication system 1.

FIG. 12 is a sequence diagram of the authentication system 1.

As shown in FIG. 12, first, the display terminal 30 (the image acquisition unit 35*b*) acquires a captured image including the person to be authenticated U who is in front of the security gate 50 from the camera 31, the captured image being captured by the camera 31 (Step S50).

Next, the display terminal 30 (the communication unit 37) transmits the captured image acquired in Step S50 to the authentication control apparatus 20 (Step S51).

Next, the authentication control apparatus 20 (the communication unit 24) receives the captured image transmitted in Step S51 and the image acquisition unit 22*b* acquires the captured image received by the communication unit 24 (Step S52).

Next, the authentication control apparatus 20 (the authentication control unit 22*c*) transmits a face authentication request for requesting face authentication of the person to be authenticated U included in the captured image acquired in Step S52 to the authentication apparatus 10 via the communication unit 24 (Step S53). This face authentication request includes the captured image acquired in Step S52.

Next, the authentication apparatus 10 executes, when the communication unit 14 has received the face authentication request transmitted in Step S53, face authentication processing (see FIG. 6) (Step S54).

Next, the authentication apparatus 10 (the authentication unit 12*e*) transmits the results of the authentication to the authentication control apparatus 20 that has transmitted the face authentication request via the communication unit 14 (Step S55). It is assumed here that information indicating that the authentication has been successfully performed and the user ID of the person to be authenticated U whose face has been successfully authenticated to the authentication control apparatus 20 as the results of the authentication.

Next, the authentication control apparatus 20 (the communication unit 24) receives the result of the face authentication transmitted in Step S55 and the user ID, and the face authentication result acquisition unit 22*d* acquires the result of the face authentication and the user ID that the communication unit 24 has received (Step S56).

Next, when the face authentication has been successfully performed (when the result of the face authentication acquired in Step S56 indicates that the authentication has been successfully performed), the authentication control apparatus 20 executes privacy protection information specifying processing (see FIG. 9) in order to specify the privacy protection information on the person to be authenticated U whose face has been successfully authenticated (Step S57). It is assumed here that the avatar image G1 shown in FIG. 10 has been specified as the privacy protection information.

Next, when the privacy protection information has been successfully specified in Step S57, the authentication control apparatus 20 (the display control unit 22*a*) transmits a privacy protection information display instruction for displaying the specified privacy protection information to the display terminal 30 via the communication unit 24 (Step S58). This privacy protection information display instruction includes the privacy protection information specified in the above Step S57.

Next, when the communication unit 37 has received the privacy protection information display instruction transmitted in Step S58, the display terminal 30 (the display control unit 35*a*) displays the screen G including the privacy protection information included in the received privacy protection information display instruction on the display surface of the display unit 32 (Step S59). The display terminal 30 displays the screen G as shown in, for example, FIG. 10.

When the face authentication has failed (when the result of the face authentication acquired in Step S56 indicates that the authentication has failed), the processing of Steps S57-S59 is not executed. In this case, information indicating that the authentication has failed is displayed, for example, on the display unit 32.

As described above, according to the second example embodiment, when face authentication has been successfully performed, the privacy protection information on the person to be authenticated whose face has been successfully authenticated is displayed, whereby, even in a case in which a third party is present near the target person to be recognized, it is possible for the target person to be recognized to know that his/her face has been successfully authenticated without his/her personal information being known to the above third party.

Next, a modified example will be described.

While the example in which the security gate 50 is used has been described in the second example embodiment, this is merely one example. For example, the security gate 50 may be omitted. In this case, the camera 31 captures, for example, an image including the person to be authenticated who is walking. In this case, the authentication apparatus 10 acquires the captured image including the person to be authenticated who is walking, and executes face authentication processing (see FIG. 6) (so-called walkthrough face authentication).

When the walkthrough face authentication is executed, the privacy protection information may be displayed on a desired part where the person to be authenticated is going to pass through. The privacy protection information may be displayed, for example, on the display terminal 30 (the display surface of the display unit 32) provided in a desired part where the person to be authenticated is going to pass through. In this case, the privacy protection information may be displayed at a timing when the person to be authenticated passes through an area near the display area (e.g., the display surface of the display unit 32) in which the privacy protection information is displayed. Note that the privacy protection information may be displayed by projecting the privacy protection information onto the floor surface which is in front of the person to be authenticated.

Further, while the example in which the avatar image is used as the privacy protection information has been described in the above second example embodiment, this is merely one example. The privacy protection information may be, for example, a clothing area of the person to be authenticated extracted from the captured image acquired in Step S20.

Further, the privacy protection information may be the color of the clothing of the person to be authenticated detected from the captured image acquired in Step S20. Note that this color may be used as the background color of the avatar image according to the second example embodiment.

Further, the privacy protection information may be property information of the person to be authenticated or the color in accordance with the property information. For example, the privacy protection information may be displayed in blue if the amount of money is equal to or larger than a predetermined amount and may be displayed in red if the amount of money is smaller than the predetermined amount. Note that the property information may be specified by providing, for example, a property information storage unit (not shown) that stores the person to be authenticated (user ID) and the property information in association with each other in the authentication control apparatus 20 and referring to this property information storage unit. The property information may be acquired, for example, by a method (see FIG. 8) similar to the method of acquiring the privacy protection information and may be registered in the property information storage unit. The property information is, for example, the one input by the person to be authenticated in the registration terminal 40. This property information may be, for example, a charged balance in an IC card of the person to be authenticated (user) or a monthly usage amount of this IC card. Further, the property information may be the amount of money in a wallet that the person to be authenticated has or the account balance of a financial institution such as a bank. Further, the color in accordance with the property information may be specified, for example, by providing a color storage unit (not shown) that corresponds to the property information and stores the range of the money amount and the color in association with each other in the authentication control apparatus 20 and referring to this color storage unit. Note that this color may be used as the background color of the avatar image according to the second example embodiment. According to this modified example, when the face authentication has been successfully performed, the property information of the person to be authenticated or the color in accordance with the property information is displayed on the display terminal 30 (the display surface of the display unit 32) as the privacy protection information on the person to be authenticated whose face has been successfully authenticated, whereby, even in a case in which a third party is present near the target person to be recognized, it is possible for the target person to be recognized to know that his/her face has been successfully authenticated without his/her personal information being known to this third party.

Further, the privacy protection information may be schedule information of the person to be authenticated or the color in accordance with the schedule information. Note that the schedule information can be specified by, for example, providing a schedule information storage unit (not shown) that stores the person to be authenticated (user ID) and the schedule information in association with each other in the authentication control apparatus 20 and referring to this schedule information storage unit. The schedule information can be acquired, for example, by a method (see FIG. 8) similar to the method of acquiring the privacy protection information and can be registered in the above schedule information storage unit. The schedule information is the one that has been input, for example, by the person to be authenticated in the registration terminal 40. This schedule information may be, for example, a list of the schedule of the person to be authenticated (user) on that day or an upcoming schedule. Further, the color in accordance with the schedule information may be specified by providing, for example, a color storage unit (not shown) that corresponds to the schedule information and stores a schedule item and the color in association with each other in the authentication control apparatus 20 and referring to this color storage unit. Note that this color may be used as the background color of the avatar image according to the second example embodiment. According to this modified example, when face authentication has been successfully performed, the above schedule information of the person to be authenticated or the color in accordance with the schedule information is displayed on the display terminal 30 (the display surface of the display unit 32) as the privacy protection information on the person to be authenticated whose face has been successfully authenticated, whereby, even in a case in which a third party is present near the target person to be recognized, it is possible for the target person to be recognized to know that his/her face has been successfully authenticated without his/her personal information being known to the above third party.

Further, while the examples of the face authentication have been described in the above second example embodiment, the present invention is not limited to being applied to face authentication and may also be applied to other types of biometrics authentication such as iris authentication or fingerprint authentication.

In the first and second example embodiments, the program(s) can be stored and provided to a computer using any type of non-transitory computer readable media. Non-transitory computer readable media include any type of tangible storage media. Examples of non-transitory computer readable media include magnetic storage media (e.g., flexible disks, magnetic tapes, hard disk drives), optical magnetic storage media (e.g., magneto-optical disks), CD-Read Only Memory (ROM), CD-R, CD-R/W, semiconductor memories (e.g., a mask ROM, a Programmable ROM (PROM), an Erasable PROM (EPROM), a flash ROM, or a Random Access Memory (RAM)). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

All the numerical values shown in the above example embodiments are merely examples and it is needless to say that numerical values other than those described above may be used as appropriate.

The above example embodiments are merely examples in every aspect. The present invention should not be interpreted in a limited way by the descriptions in the above example embodiments. The present invention may be executed in various other forms without departing from its spirit and main features.

The whole or part of the example embodiment disclosed above can be described as, but not limited to, the following supplementary notes.

(Supplementary Note 1)

An authentication control apparatus comprising:

image acquisition means for acquiring an image including a person to be authenticated captured by a camera that photographs the person to be authenticated;

authentication control means for causing an authentication apparatus that executes face authentication to execute face authentication of the person to be authenticated included in the image acquired by the image acquisition means; and display control means for causing, when the face authentication has been successfully performed, a display apparatus to display privacy protection information of the person to be authenticated whose face has been successfully authenticated for the purpose of letting the person to be authenticated whose face has been successfully authenticated visually recognize that the face authentication has been successful.

(Supplementary Note 2)

The authentication control apparatus according to Supplementary Note 1, further comprising:

storing means for storing a person to be authenticated and privacy protection information in association with each other; and specifying means for specifying privacy protection information associated with the person to be authenticated whose face has been successfully authenticated in the storing means, wherein the display control means causes, when the face authentication has been successfully performed, the display apparatus to display privacy protection information specified by the specifying means for the purpose of enabling the person to be authenticated whose face has been successfully authenticated to visually recognize that the face authentication has been successful.

(Supplementary Note 3)

The authentication control apparatus according to Supplementary Note 2, further comprising:

acquisition means for acquiring privacy protection information to be registered specified by the person to be authenticated; and registration means for registering the privacy protection information to be registered acquired by the acquisition means in the storing means in association with the person to be authenticated who has specified the privacy protection information to be registered.

(Supplementary Note 4)

The authentication control apparatus according to any one of Supplementary Notes 1 to 3, wherein the privacy protection information is information notifying the person to be authenticated whose face has been successfully authenticated of information indicating that his/her face has been successfully authenticated, the information not including his/her personal information.

(Supplementary Note 5)

The authentication control apparatus according to any one of Supplementary Notes 1 to 4, further comprising clothing extraction means for extracting a clothing area of the person to be authenticated from the image acquired by the image acquisition means, wherein the authentication control means causes the clothing area that has been extracted by the clothing extraction means to be displayed as the privacy protection information.

(Supplementary Note 6)

The authentication control apparatus according to any one of

Supplementary Notes 1 to 5, further comprising clothing color detection means for detecting the color of the clothing of the person to be authenticated from the image acquired by the image acquisition means, wherein the authentication control means causes the color of the clothing detected by the clothing color detection means to be displayed as the privacy protection information.

(Supplementary Note 7)

The authentication control apparatus according to any one of Supplementary Notes 1 to 5, further comprising:

property information storing means for storing a person to be authenticated in association with property information; and property information specifying means for specifying property information associated with the person to be authenticated whose face has been successfully authenticated in the property information storing means, wherein the authentication control means causes the display apparatus to display the color in accordance with the property information specified by the property information specifying means as the privacy protection information.

(Supplementary Note 8)

The authentication control apparatus according to any one of Supplementary Notes 1 to 5, further comprising:

schedule information storing means for storing a person to be authenticated in association with schedule information; and schedule information specifying means for specifying schedule information associated with the person to be authenticated whose face has been successfully authenticated in the schedule information storing means, wherein the authentication control means causes the display apparatus to display the color in association with the schedule information specified by the schedule information specifying means as the privacy protection information.

(Supplementary Note 9)

The authentication control apparatus according to any one of Supplementary Notes 1 to 8, wherein the image acquisition means acquires an image including the person to be authenticated who has been captured by the camera and is in front of a security gate.

(Supplementary Note 10)

The authentication control apparatus according to any one of Supplementary Notes 1 to 9, wherein the display apparatus is provided in or near the security gate.

(Supplementary Note 11)

The authentication control apparatus according to any one of

Supplementary Notes 1 to 8, wherein the image acquisition means acquires an image including a person to be authenticated who is walking captured by the camera.

(Supplementary Note 12)

The authentication control apparatus according to Supplementary Note 11, wherein the authentication control means causes the display apparatus to display the privacy protection information at a timing when the person to be authenticated passes through an area near a display area where the privacy protection information is displayed.

(Supplementary Note 13)

An authentication system comprising:

a camera that photographs a person to be authenticated;

a display apparatus;

image acquisition means for acquiring an image that includes a person to be authenticated who has been captured by the camera;

authentication control means for causing an authentication apparatus that executes face authentication to execute face authentication of the person to be authenticated included in the image acquired by the image acquisition means; and display control means for causing, when the face authentication has been successfully performed, the display apparatus to display privacy protection information of the person to be authenticated whose face has been successfully authenticated for the purpose of letting the person to be authenticated whose face has been successfully authenticated visually recognize that the face authentication has been successful.

(Supplementary Note 14)

The authentication system according to Supplementary Note 13, comprising an information processing apparatus, an authentication control apparatus, and an authentication apparatus capable of communicating with one another via a network, wherein the camera and the display apparatus are provided in the information processing apparatus, and the image acquisition means, the authentication control means, and the display control means are provided in the authentication control apparatus.

(Supplementary Note 15)

An authentication control method comprising:

an image acquisition step of acquiring an image including a person to be authenticated captured by a camera that photographs the person to be authenticated;

an authentication control step of causing an authentication apparatus that executes face authentication to execute face authentication of the person to be authenticated included in the image acquired in the image acquisition step; and a display control step of causing, when the face authentication has been successfully performed, a display apparatus to display privacy protection information of the person to be authenticated whose face has been successfully authenticated for the purpose of letting the person to be authenticated whose face has been successfully authenticated visually recognize that the face authentication has been successful.

(Supplementary Note 16)

A computer readable storage medium storing a program for causing an electronic device including at least one processor to execute:

an image acquisition step of acquiring an image including a person to be authenticated captured by a camera that photographs the person to be authenticated;

an authentication control step of causing an authentication apparatus that executes face authentication to execute face authentication of the person to be authenticated included in the image acquired in the image acquisition step; and a display control step of causing, when the face authentication has been successfully performed, a display apparatus to display privacy protection information of the person to be authenticated whose face has been successfully authenticated for the purpose of letting the person to be authenticated whose face has been successfully authenticated visually recognize that the face authentication has been successful.

REFERENCE SIGNS LIST

1 Authentication System
10 Authentication Apparatus
11 Storage Unit
11*a* Program
12 Control Unit
12*a* Image Acquisition Unit
12*b* Face Detection Unit
12*c* Feature Point Extraction Unit
12*d* Registration Unit
12*e* Authentication Unit
13 Memory
14 Communication Unit
20 Authentication Control Apparatus
21 Storage Unit
21*a* Program
22 Control Unit
22*a* Display Control Unit (Display Control Means)
22*b* Image Acquisition Unit (Image Acquisition Means)
22*c* Authentication Control Unit (Authentication Control Means)
22*d* Face Authentication Result Acquisition Unit
22*e* Privacy Protection Information Acquisition Unit
22*f* Registration Unit
22*g* Specifying Unit
23 Memory
24 Communication Unit
30 Display Terminal (Display Apparatus)
31 Camera
32 Display Unit
34 Storage Unit
34*a* Program
35 Control Unit
35*a* Display Control Unit
35*b* Image Acquisition Unit
36 Memory
37 Communication Unit
40 Registration Terminal
50 Security Gate
11*b* Face Information DB
21*b* Privacy Protection Information DB
G Screen
G1 Privacy Protection Information (Avatar Image)
G2 Time Information
G3 Purpose Information
NW Network
U Person to be Authenticated

What is claimed is:

1. An authentication control apparatus comprising:

at least one memory storing instructions; and at least one processor configured to execute the instructions to:

acquire an image including a person to be authenticated, the image being captured by a camera that photographed the person to be authenticated;

cause an authentication apparatus to execute face authentication of the person to be authenticated included in the image acquired; and cause, in a case where the face authentication has been successfully performed, a display apparatus, which is installed in an environment where a third party is present, to display privacy protection information of the person to be authenticated whose face has been successfully authenticated for the purpose of letting the person to be authenticated whose face has been successfully authenticated visually recognize that the face authentication has been successful.

2. The authentication control apparatus according to claim 1, wherein the at least one processor is further configured to execute the instructions to:

store a person to be authenticated and privacy protection information in association with each other; and specify privacy protection information associated with the person to be authenticated whose face has been successfully authenticated; and cause, in a case where the face authentication has been successfully performed, the display apparatus to display privacy protection information specified for the purpose of enabling the person to be authenticated whose face has been successfully authenticated to visually recognize that the face authentication has been successful.

3. The authentication control apparatus according to claim 2, wherein the at least one processor is further configured to execute the instructions to:

acquire privacy protection information to be registered which has been specified by the person to be authenticated; and register the privacy protection information to be registered acquired in association with the person to be authenticated who has specified the privacy protection information to be registered.

4. The authentication control apparatus according to claim 1, wherein the privacy protection information is information notifying the person to be authenticated whose face has been successfully authenticated of information indicating that his/her face has been successfully authenticated, the information not including his/her personal information.

5. The authentication control apparatus according to claim 1, wherein the at least one processor is further configured to execute the instructions to:

extract a clothing area of the person to be authenticated from the image acquired; and cause the clothing area that has been extracted to be displayed as the privacy protection information.

6. The authentication control apparatus according to claim 1, wherein the at least one processor is further configured to:

execute the instructions to detect a color of clothing of the person to be authenticated from the image acquired; and cause the color of the clothing detected to be displayed as the privacy protection information.

7. The authentication control apparatus according to claim 1, wherein the at least one processor is further configured to execute the instructions to:

store a person to be authenticated in association with property information;

specify property information associated with the person to be authenticated whose face has been successfully authenticated; and cause the display apparatus to display the color in accordance with the property information specified as the privacy protection information.

8. The authentication control apparatus according to claim 1, wherein the at least one processor is further configured to execute the instructions to:

store the person to be authenticated in association with schedule information;

specify schedule information associated with the person to be authenticated whose face has been successfully authenticated as the privacy protection information; and cause the display apparatus to display a color in association with the schedule information specified as the privacy protection information.

9. The authentication control apparatus according to claim 1, wherein the at least one processor is further configured to execute the instructions to acquire an image including the person to be authenticated who has been captured by the camera and is in front of a security gate.

10. The authentication control apparatus according to claim 1, wherein the display apparatus is provided in or near the security gate.

11. The authentication control apparatus according to claim 1, wherein the at least one processor is further configured to execute the instructions to acquire an image including a person to be authenticated who is walking captured by the camera.

12. The authentication control apparatus according to claim 11, wherein the at least one processor is further configured to execute the instructions to cause the display apparatus to display the privacy protection information at a timing in a case where the person to be authenticated passes through an area near a display area where the privacy protection information is displayed.

13. An authentication system comprising:

a camera configured to photograph a person to be authenticated;

a display apparatus;

an image acquisition means for acquiring an image that includes a person to be authenticated, the image being captured by the camera;

an authentication control means for causing an authentication apparatus to execute face authentication of the person to be authenticated included in the image acquired by the image acquisition means; and a display control means for causing, in a case where the face authentication has been successfully performed, the display apparatus, which is installed in an environment where a third party is present, to display privacy protection information of the person to be authenticated whose face has been successfully authenticated for the purpose of letting the person to be authenticated whose face has been successfully authenticated visually recognize that the face authentication has been successful.

14. The authentication system according to claim 13, comprising an information processing apparatus, an authentication control apparatus, and an authentication apparatus capable of communicating with one another via a network, wherein:

the camera and the display apparatus are provided in the information processing apparatus, and the image acquisition means, the authentication control means, and the display control means are provided in the authentication control apparatus.

15. An authentication control method comprising:

an image acquisition operation comprising acquiring an image including a person to be authenticated, the image being captured by a camera that photographed the person to be authenticated;

an authentication control operation comprising causing an authentication apparatus to execute face authentication of the person to be authenticated included in the image acquired in the image acquisition step; and a display control operation comprising causing, in a case where the face authentication has been successfully performed, a display apparatus, which is installed in an environment where a third party is present, to display privacy protection information of the person to be authenticated whose face has been successfully authenticated for the purpose of letting the person to be authenticated whose face has been successfully authenticated visually recognize that the face authentication has been successful.

16. A computer readable storage medium storing a program for causing an electronic device including at least one processor to execute:

an image acquisition operation comprising acquiring an image including a person to be authenticated, the image being captured by a camera that photographed the person to be authenticated;

an authentication control operation comprising causing an authentication apparatus to execute face authentication of the person to be authenticated included in the image acquired in the image acquisition step; and a display control operation comprising causing, in a case where the face authentication has been successfully performed, a display apparatus, which is installed in an environment where a third party is present, to display privacy protection information of the person to be authenticated whose face has been successfully authenticated for the purpose of letting the person to be authenticated whose face has been successfully authenticated visually recognize that the face authentication has been successful.

* * * * *